United States Patent
O'Toole et al.

(10) Patent No.: US 12,222,802 B2
(45) Date of Patent: *Feb. 11, 2025

(54) FAILURE RECOVERY RECOMMENDATIONS FOR CLI COMMANDS

(71) Applicant: MICROSOFT TECHNOLOGY LICENSING, LLC., Redmond, WA (US)

(72) Inventors: Christopher O'Toole, Redmond, WA (US); Roshanak Zilouchian Moghaddam, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,828

(22) Filed: Nov. 30, 2023

(65) Prior Publication Data

US 2024/0118967 A1    Apr. 11, 2024

Related U.S. Application Data

(63) Continuation of application No. 17/100,911, filed on Nov. 22, 2020, now Pat. No. 11,860,725.

(Continued)

(51) Int. Cl.
*G06F 11/07* (2006.01)
*G06F 11/32* (2006.01)
(Continued)

(52) U.S. Cl.
CPC ...... *G06F 11/0793* (2013.01); *G06F 11/0772* (2013.01); *G06F 11/327* (2013.01); *G06F 18/214* (2023.01); *G06N 20/00* (2019.01)

(58) Field of Classification Search
CPC ............ G06F 11/0793; G06F 11/0772; G06F 11/327; G06F 18/214; G06N 20/00
See application file for complete search history.

(56) References Cited

U.S. PATENT DOCUMENTS 7,373,549 B2 * 5/2008 Malpani .............. G06F 11/1435
714/4.11
7,757,118 B2 * 7/2010 Chiang .................. G11B 20/10
714/15

(Continued)

FOREIGN PATENT DOCUMENTS

CN    111994016 A  * 11/2020
DE    112013005338 T5 * 7/2015 .......... G06F 11/0721

OTHER PUBLICATIONS

English Translation of DE-112013005338-T5 (Year: 2013).*
Translation of CN-111994016-A (Year: 2020).*

*Primary Examiner* — Henry Tsai
*Assistant Examiner* — John B Roche

(57) ABSTRACT

A failure recommendation system for a command line interface (CLI) uses machine learning to predict the most likely command to correct an unsuccessful or failed attempt to perform an intended operation using the CLI. The failure recommendation system is based on a conditional probability model trained on failure-success pairs of commands from CLI telemetry data to learn the most likely command to remediate a failure. The conditional probability model predicts the most likely command based on a failure type and the failed command. The failure type is identified through a failure type classifier and is used to select the most likely command to remediate a failure from the different events that may lead to a failure.

20 Claims, 10 Drawing Sheets

Related U.S. Application Data

(60) Provisional application No. 63/081,846, filed on Sep. 22, 2020.

(51) Int. Cl.
*G06F 18/214* (2023.01)
*G06N 20/00* (2019.01)

(56) References Cited

U.S. PATENT DOCUMENTS

2020/0097357 A1* 3/2020 Shwartz .................... G06F 8/70
2020/0150985 A1* 5/2020 Moghaddam ....... H04L 41/0803

* cited by examiner

FAILURE RECOVERY RECOMMENDATIONS FOR CLI COMMANDS

CROSS-REFERENCE TO RELATED APPLICATIONS

The present application is a continuation of application Ser. No. 17/100,911 filed on Nov. 22, 2020, entitled "FAILURE RECOVERY RECOMMENDATIONS FOR CLI COMMANDS", which claims the benefit of the earlier filed provisional application having Ser. No. 63/081,846 filed on Sep. 22, 2020, both of which are incorporated by reference in their entirety.

BACKGROUND

A command line interface (CLI) is an application in which a user enters commands of a CLI-based application in the form of a string of text characters. The command line interface is a text-based interface in which the commands are manually typed. The command line interface accepts commands in a designated input field which are then executed by a command line interpreter. This type of user interface is advantageous over a graphical user interface (GUI) where a user uses a mouse or fingers to click images of icons to access files or programs and/or to execute various operations. The command line interface is faster and more efficient than a GUI since it is composable, that is, several tasks can be specified in a single text string thereby eliminating numerous interactions with the GUI. A CLI is less-resource intensive than a GUI since it is text-based rather than graphical. There are several communication protocols used for a command line interface requiring less bandwidth than a graphical application streamed over a remote desktop or remote server.

The use of a command line interface requires a user to be familiar with the commands supported by the CLI-based application and the correct syntax of the commands. Often, there are a large number of commands with each command having various parameters and parameter values. The availability of good reference documentation for the commands may be limited or outdated as the syntax of the commands changes dynamically.

Given the fast-changing nature of the syntax of the CLI commands, developers may struggle with finding the correct commands or combination of command, parameters, and parameter values to perform an intended operation with the cloud-based application. In addition, the developers may struggle with the error messages that reject a command. The lack of additional guidance impacts the usefulness of the cloud-based application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A failure recommendation system generates recommendations to correct an unsuccessful or failed attempt at performing an intended operation using a command line interface. A conditional probability model is trained to learn the probability of an example command that is likely to correct a command failure from failure-success pairs obtained from CLI telemetry data. The conditional probability model is built on the assumption that when a command fails, the next successfully-executed command remedied the failure provided a set of conditions is satisfied. The failure-success pairs represent a failed command and the immediately following successfully-executed command that is likely to have remedied the command failure.

A failure type is used to more accurately predict an example command and its parameters since there may be many causes of a failure. A classifier is used to identify the failure type of a failed command given the error message that identified the failure. The conditional probability model uses the failed command and the failure type to more accurately predict the example command and its parameters for a recommendation.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Aspects of the present invention pertain to a failure recommendation system that predicts recommendations to rectify a failure in the execution of a CLI script. A command line interface processes commands to a CLI-based application through lines of text that are embedded in a CLI script. The CLI has a specific syntax for each command which consists of a command, zero or more subcommands, zero or more parameters with and without parameter values. The failure recommendation system uses machine learning models to predict one or more recommendations to remedy a failed command. A recommendation includes an example command that is likely succeed at performing the intended operation.

Machine learning provides a mechanism to learn failure-success patterns from previous failed attempts in order to more accurately predict the example command likely to succeed a failed command. A conditional probability model is built on the assumption that if a command fails, the next successfully-executed command remedied the failure provided that a set of conditions is satisfied. The conditional probability model learns the probability of a successfully-executed command based on failure-success pairs obtained from historical usage data, such as the CLI telemetry data.

A command may fail for a variety of reasons including wrong parameter combinations, error in the syntax of the command, errors in the parameter names or parameter values, wrong assumptions about the state of a resource, and so forth. In order to predict a meaningful recommendation, the failure recommendation system has to account for the various causes of a failed command. For this reason, the conditional probability model considers the failure type of a failure in order to more accurately predict an example command. The failure type is predicted using a classifier, such as a random forest classifier, based on the most frequently-occurring types of failures found in the CLI telemetry data.

In addition, the failure recommendation system uses a parameter value type classifier to predict a data type of parameter value for those commands requiring a parameter. A recommendation is more useful if actual values are used for the parameter values rather than placeholders. Parameter values are learned from publicly-accessible data and not from the telemetry data of the CLI. Knowledge of the data type of a parameter value improves the search for the correct parameter value when a parameter has multiple types of parameter values.

Attention now turns to a further discussion of the system, devices, components, and methods utilized in inferring failure recommendations.

System

Figure 1:
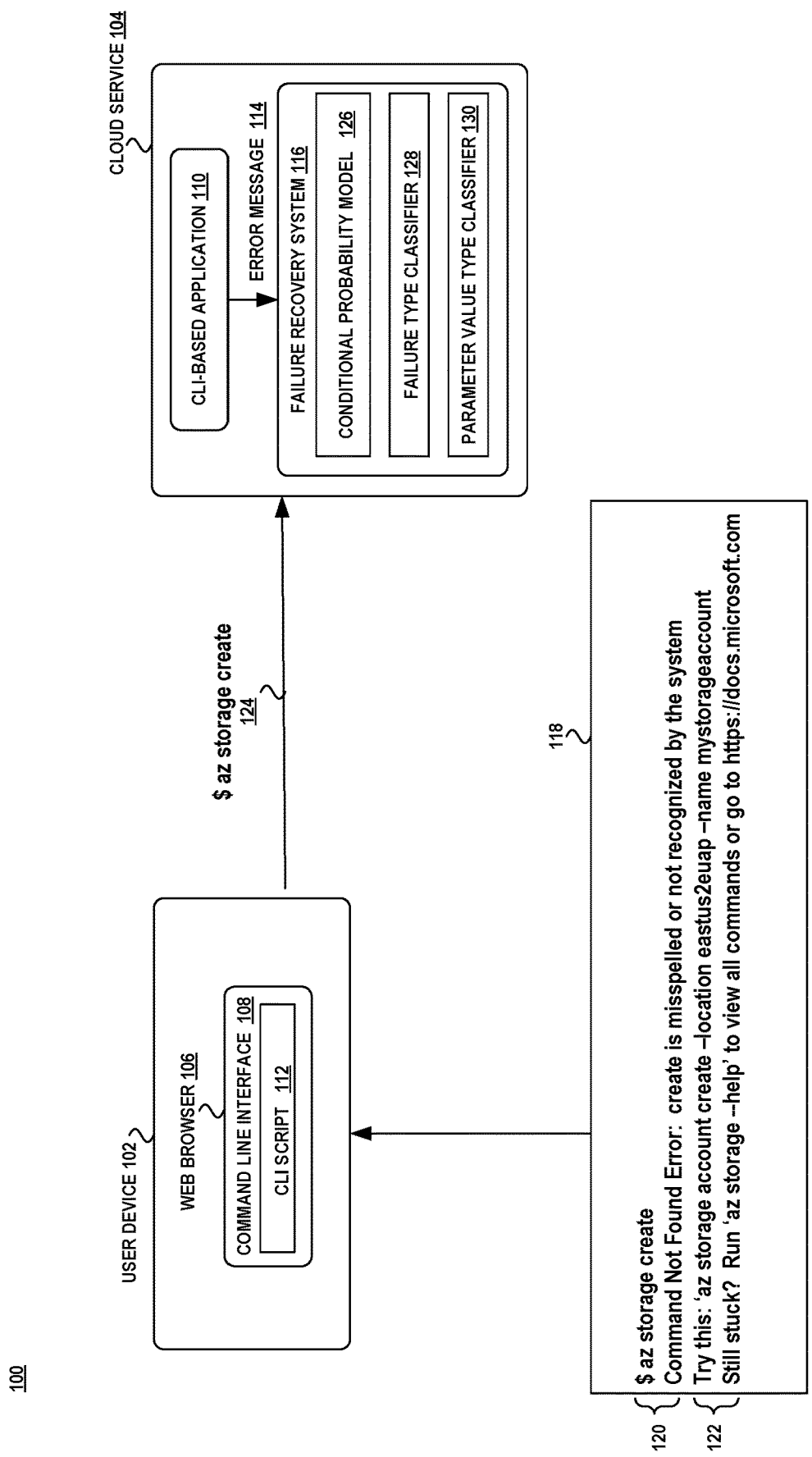
FIG. 1 illustrates an exemplary system for generating failure recovery recommendations.

FIG. 1 illustrates an exemplary system 100 in which various aspects of the invention may be practiced. The system 100 includes a user device 102 coupled to a cloud service 104 through a network. The user device 102 hosts a command line interface 108 coupled to a CLI-based application 110 of the cloud service 104. The CLI-based application 110 receives commands, such as a CLI script 112, initiated from the user device 102. In one aspect, the CLI-based application 110 may be a cloud management and deployment application. The CLI 108 may be a shell program that is executed through a web browser or rich client application 106.

The CLI 108 enables a user (e.g. developer, customer) of the user device 102 to access resources on the CLI-based application 110 through CLI commands. In one aspect, the CLI commands are entered into a command prompt or input field of the CLI 108 and transformed into Representational State Transfer (REST) Application Programming Interfaces (API)s. The REST APIs are service endpoints that support a set of HTTP operations or methods to create, retrieve, update, delete or access resources on the cloud service.

A user of the user device 102 may use a CLI script 112 to request an operation to be performed by the CLI-based application 110. A CLI script 112 is an ordered sequence of one or more commands. CLI commands can vary in complexity depending on their usage and the parameters required to execute the CLI commands. Some CLI commands may require one or more input parameters which may be derived from the output of previously-executed commands. The CLI script 112 includes the sequence of commands needed to perform an operation in a specific order with the correct number of parameters and parameter values.

An exemplary CLI is the Azure® command line interface for the Microsoft® Azure® cloud computing service. This cloud computing service provides various services, such as software-as-a-service (Saas), platform-as-a-service (PaaS), and infrastructure-as-a-service (IaaS) to build, test, deploy, and manage services and applications in addition to providing different programming tools. It should be noted that the techniques described herein are not limited to this particular CLI or to a particular configuration of a CLI.

At times a command may fail for various reasons. A command may utilize the wrong parameter combinations, there may be errors in the parameter names or parameter values, or there may be wrong assumptions made about the state of a resource. An error message 114 is generated by the CLI-based application 110 and passed onto the failure recovery system 116 which generates recommendations to assist the user. For example, as shown in FIG. 1, a user may initiate a CLI script containing the text string "$ az storage create" 124 which is rejected by the CLI-based application 110 as not being recognized. The failure recovery system 116 receives the error message 114 from the CLI-based application 110 and generates a response 118 to the user which includes an error message 120 and a recommendation 122 to assist the user in remedying the failure.

The failure recovery system 116 utilizes several machine learning models to predict a recommendation to assist the user in correcting their failure. In one aspect, the failure recovery system 116 uses a conditional probability model 126 constructed as a lookup table, a failure type classifier 128, and a parameter value data type classifier 130.

The conditional probability model 126 is built on the assumption that if a command fails, the CLI script would contain a sequence of commands to successfully remedy the failure. An analysis of these failures provides insight into the patterns used to remedy a failure. A statistical analysis of these patterns significantly improves the probability that a recommended command is more likely to correct a failure. A conditional probability model exploits this property by determining a probability of a successful command following an immediately preceding failed command. The failure type classifier 128 is used to determine the type of the failure and the parameter value type classifier 130 is used to determine the data type of a parameter value when a parameter is used with a particular command.

Figure 2:
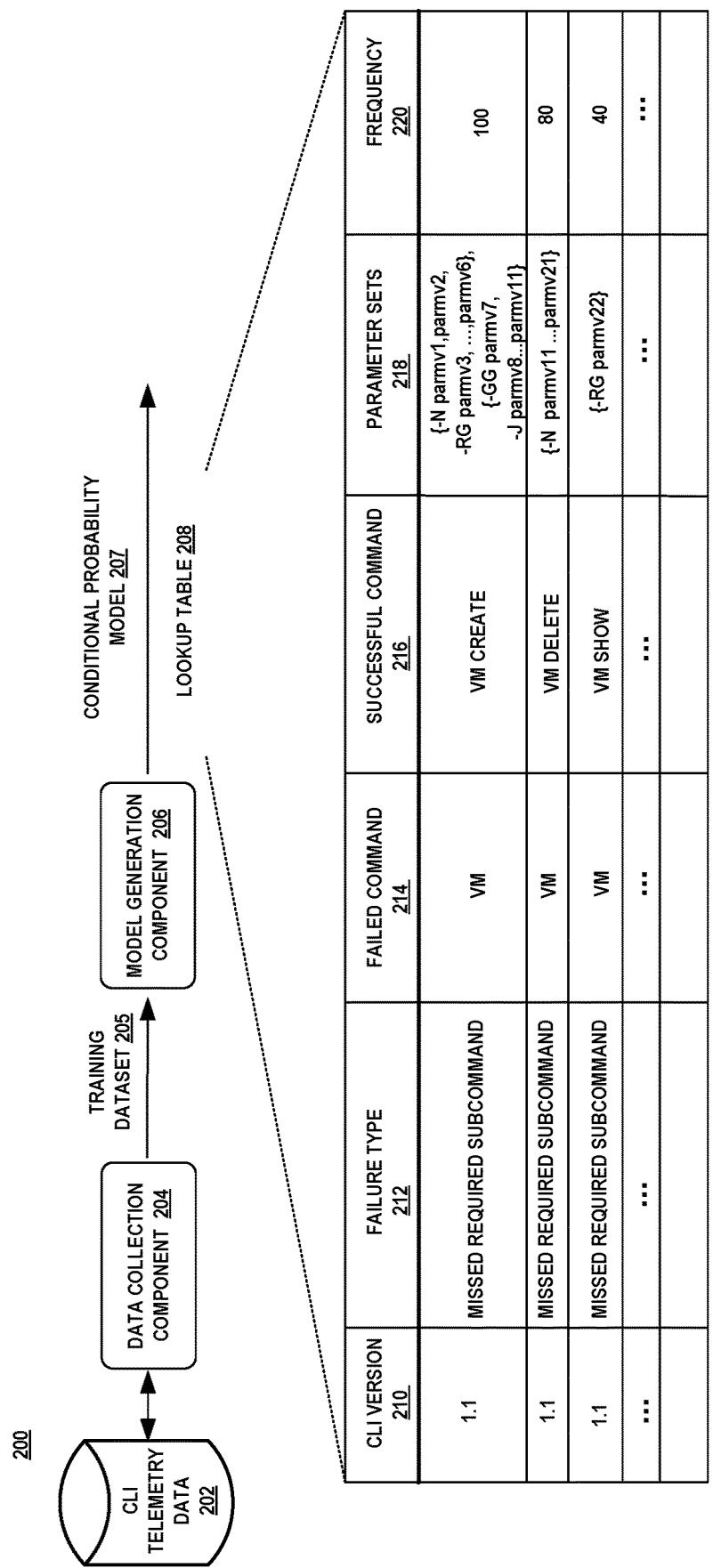
FIG. 2 is a schematic diagram illustrating an exemplary configuration of the components and process used in training a conditional probability model.

FIG. 2 illustrates an exemplary configuration of the components and process used to train the conditional probability model 200. A data collection component 204 generates a training dataset 205 from CLI telemetry data 202. The CLI telemetry data 202 is obtained from monitoring the production usage of the CLI-based application. In a typical month, CLI users execute millions of commands to create, delete, and manage resources. Some of these commands run successfully while others result in failure. The CLI telemetry data 202 is a repository of such commands along with the list of parameters used with each command, the success status of the command execution, a short description of a failure, an error message and the exception type when there is a failure. The CLI telemetry data 202 does not include parameter values due to privacy concerns.

The model generation component 206 uses the training dataset 205 to train a conditional probability model 207. A conditional probability model 207 represents statistically the relationship between the input data and the output data by modeling the conditional probability distribution of the outputs given the inputs. The conditional probability model assumes that each state is dependent on a previous state. The dependency is given by a conditional probability $P(x_t|x_{t-1}, \ldots, x_{t-n})$, where $x_t$ is the state of the model at time t and n is the order of the conditional probability model. In a first order model, a state is dependent only on the immediately preceding state. The transition probabilities are generated from the unique set of failure-success pairs detected in the training data. A transition probability may be computed as $P(x_t|x_{t-1}, \ldots, x_{t-n})=N_t/N_{total}$, where n is the order of the model, $N_t$ is the number of times $x_t$ comes after $x_{t-1}$, $N_{total}$=total number of success commands that come after $x_{t-1}$.

The conditional probability model is used to generate a lookup table 208. The lookup table is accessed by CLI version, failure type and failed command. Each entry in the table represents the features associated with a unique failed/success command pair. An entry includes the CLI version 210, a failure type 212, a failed command 214, the corresponding successful command 216, the parameter sets 218 required by the command and the frequency of the failed/success command pair 220.

In table 208, there are three entries for the failure type, missed required subcommand, which are organized by increasing frequency. Each entry contains the failed command, vm, and the associated successful command (e.g., vm create, vm delete, vm show) and parameter sets that include parameter values (e.g., {−N parmv1, parmv2, −RG parmv3 . . . parmv6}, {−GG parmv7, −J parmv8 . . . parmv11}).

Figure 3:
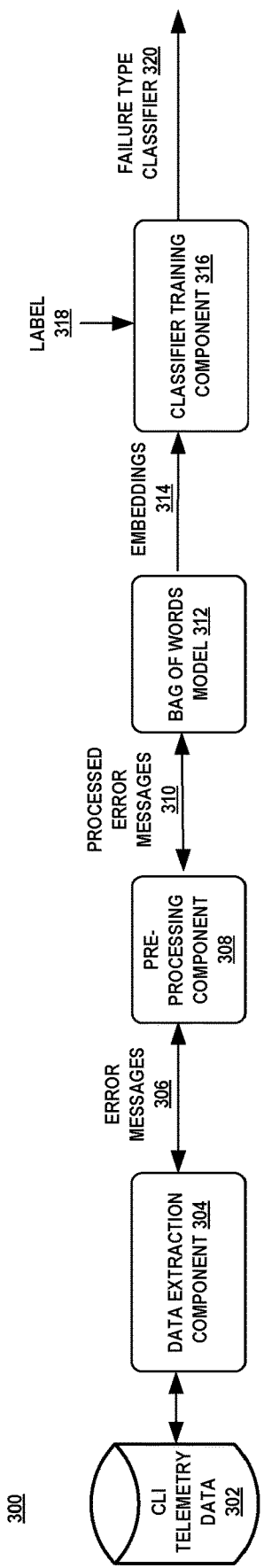
FIG. 3 is a schematic diagram illustrating an exemplary configuration of the components and process used to train a failure type classifier.

FIG. 3 represents an exemplary configuration of the components used in training the failure type classifier 300. A data extraction component 304 extracts error messages 306 from the CLI telemetry data 302 from which failure types are generated to classify the various types of failures that frequently occur. The error messages 306 include the failed command and the reason for the failure. A pre-processing component 308 processes the error messages 306 to convert the text in the error messages 310 into lower-case characters and to remove all special characters and common stop words. The resulting words are then lemmalized using WordNet lemmanizer. Lemmatization refers to the removal of inflectional endings and returning the base of the word to its lemma.

The processed error messages 310 are then used to train a bag-of-words (BOW) model 312 to generate embeddings 314. The BOW model 312 is an encoder that learns to produce a numerical representation of the words of an error message by representing their frequency of occurrence in the training dataset without regards to the semantic relationship between the words.

The classifier training component 316 receives an embedding 314 and an associated label (e.g., failure type) 318 and trains a classifier 320 to associate a failure type when given a particular error message. Exemplary failure types include UnknownSubcommand, UnableToParseCommandInput, MissingRequiredParameters, etc.

For example, an UnknownSubcommand failure type includes situations when an unknown subcommand is used with a command (e.g., az storage create). The UnableToParseCommandInput failure type pertains to the situation where the CLI is unable to parse the command input (e.g., az-s). In the case of az storage create, the subcommand create is not part of the az storage group and in the case of az-s, there is no command.

In one aspect, the failure type classifier 320 is a random forest classifier. However, it should be understood that the disclosure is not limited to this particular classifier and that other type of classifiers may be used as well, such as logistic regression or neural network-based classifiers.

A random forest classifier M consists of a fixed number of decision trees, T, that vote to predict a classification on unseen data. Each decision tree consists of a root node, multiple internal nodes referred to as split nodes, and multiple leaf nodes. Each root and split node of each tree performs a binary test on each input training data or feature vector and performs a binary test and based on the result, directs the data to the left or right child node. The leaf nodes store a probability distribution.

Each node in a decision tree i provides a probability $p_i(y|x)$ for each $y \in L$, which is obtained during training the random forest, where y is a label out of the available labels L, and x represents a feature vector of n features. The label is the data type. The final classification is obtained from a vote of all the trees, T, and the resulting label is assigned according to the following equation:

$$M(x) = \arg\max_{y \in L} \frac{1}{T} \sum_{i=1}^{T} p_i(y|x).$$

This method of combining trees is an ensemble method. The individual decision trees are weak learners and the ensemble produces a strong learner. Decision trees can suffer from over-fitting which leads to poor generalization and a higher error rate. An ensemble of decision trees, such as a random forest, improves generalization. A more detailed description is provided below.

Figure 4:
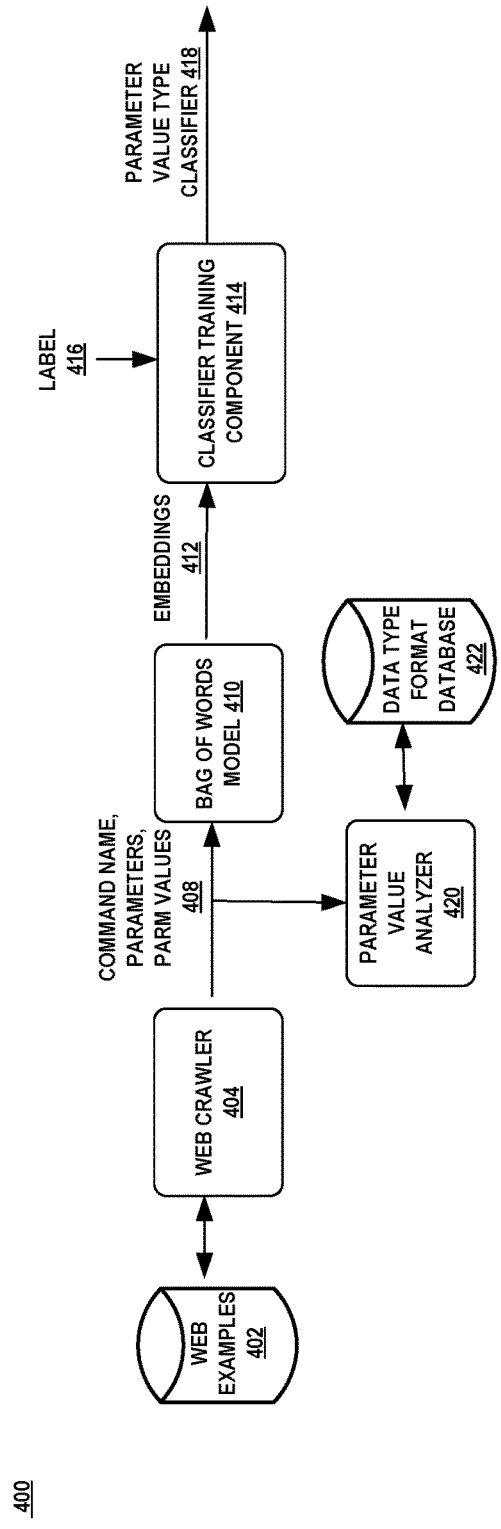
FIG. 4 is a schematic diagram illustrating an exemplary configuration of the components and process used to train a parameter value type classifier.

FIG. 4 represents an exemplary configuration of components and process 400 used to train a parameter value type classifier. In order to generate parameter values for each of the command/parameter pairs, parameter values are obtained from usage examples from publicly-accessible sources. The usage examples may come from publicly-accessible source code repositories, such as GitHub, from online documentation, and from websites containing command usage examples, such as Stackoverflow.com and other knowledge market websites 402. A usage example contains a command, a set of parameters, and parameter values for each of the parameters in a parameter set. A web crawler 404 is used to obtain publicly-accessible usage examples of the CLI commands which include a command, its parameters and parameter values. The examples are then encoded into an embedding 412 using a bag-of-words model 410. The embeddings 412 and an associated label 416 are used by the classifier training component 414 to train the parameter value type classifier 418.

For some commands, there may be multiple parameter values for a parameter and for other commands, there may not be any parameter values for a parameter. For those commands where there are multiple values for a parameter, the parameter value type classifier 418 is used to determine the data type of the parameter value associated with a paired command/parameter in order to select the correct parameter value from the multiple values. For those commands, where there are no known parameter values, the parameter value type classifier 418 generates a parameter value consistent with the predicted parameter value data type.

There may be multiple parameter values for a particular parameter data type. In order to identify the most appropriate parameter value, a data type format is used. The data type format is the format of the text string corresponding to the most appropriate parameter value. For example, for the data type, IPAddress, the lookup table may contain the parameter values "MyIPAddress", "$ip", "0.0.0.0". The data type format for an IP Address data type may indicate four integer values separated by periods or eight integer values separated by a colon. In this case, the parameter value "0.0.0.0" is selected. By way of another example, a date/time format may be one of "mm/dd/yy", "2020/mm", or "yy/dd/mm" which is used to find the date of a parameter value having a date data type.

The data type format for a particular parameter value data type is stored in the data type format database 422. The data type format is pre-configured and may be set in advance to a particular format to achieve an intended objective or may be derived by the parameter value analyzer 420. The data type format is represented by a regular expression that can specify a single value, a range of values, or a particular character string.

The parameter value analyzer 420 generates the data type format based on the frequency that a data format is found in the web examples 408. For example, for a parameter data type that is an integer, the value '0' is found in 90% of the web examples and the value '1' is found in 10% of the web examples. The parameter value analyzer 402 may generate a regular expression that indicates a single value of '1' as the integer parameter value for the example. The parameter value analyzer 402 may also generate a regular expression that indicates a range of values. A range of values, such as (−1, 0, 1) may also be used to select a parameter value where the range of values is derived from the frequency of usage in the web examples.

Figure 5:
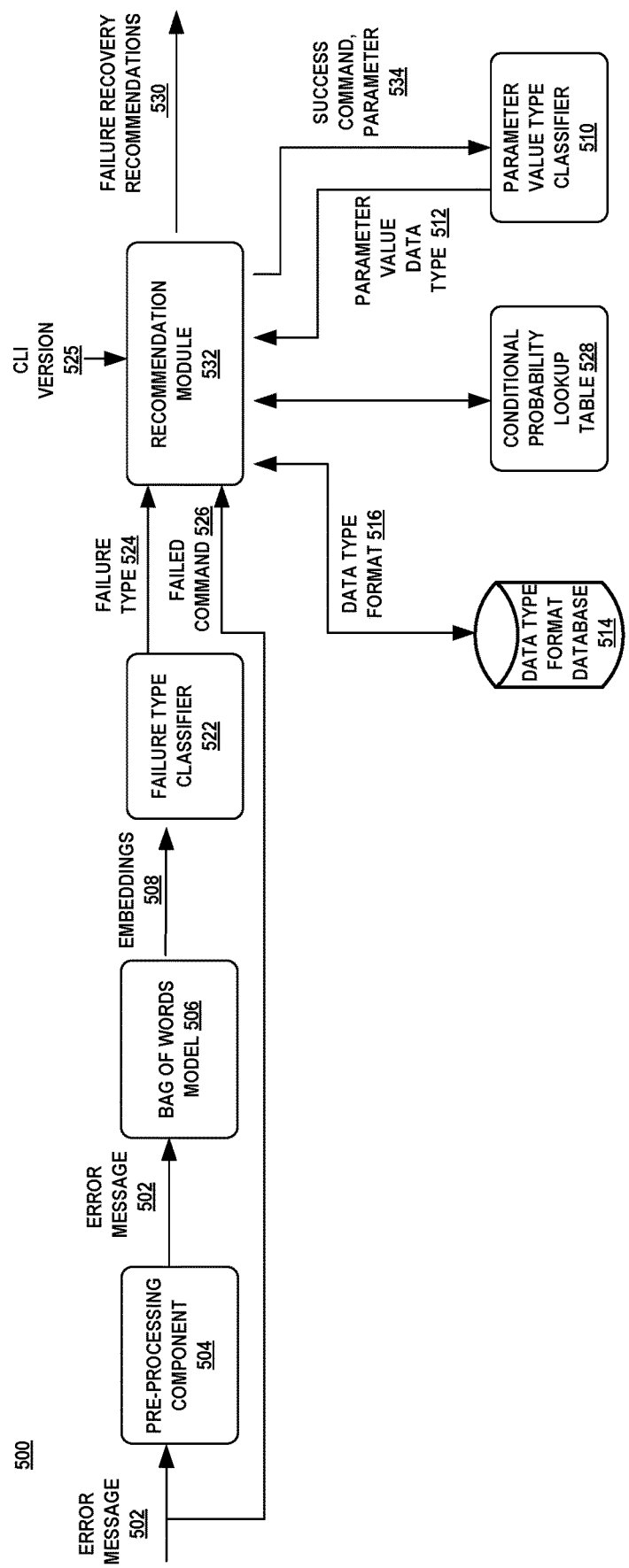
FIG. 5 is a schematic diagram illustrating an exemplary configuration of the components and process used in the inference of a failure recovery recommendation.

FIG. 5 represents an exemplary configuration of the components and process used to predict the failure recovery recommendations 530. The failure recovery system 500 receives an error message 502 from a failed execution of a CLI script. The error message 502 is processed by the pre-processing component 504, as noted above, and the processed text is input into the bag-of-words model 506 to generate embeddings 508 for the error message 502.

The embeddings of the error message 508 are input into the failure type classifier 522 to predict a failure type. The recommendation module 532 searches the conditional probability lookup table 528 using the failed command 526, the CLI version 525, and the failure type 524 to obtain the top recommendations including the top three most frequent parameters sets for a successful command. In the case where a parameter value is required for a parameter used in a recommendation, the recommendation module 532 uses the parameter value type classifier 510 given a success command and parameter name 534 to obtain a parameter value data type 512, and a corresponding data format 516 from the data type format database 514 to select an appropriate parameter value to complete a recommendation.

Methods

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 6:
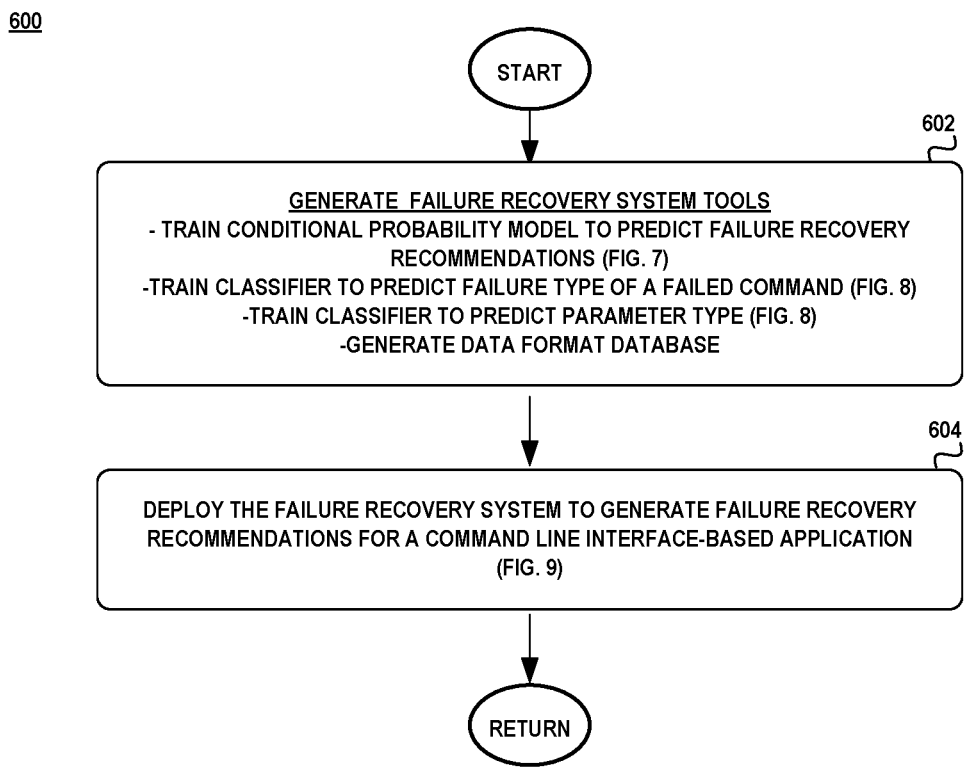
FIG. 6 is a flow diagram illustrating an exemplary method of a failure recovery system.

Attention now turns to FIG. 6 which shows an exemplary method 600 for generating failure recovery recommendations. Initially, the failure recovery system trains the tools used to facilitate the failure recovery recommendations, such as the machine learning models to predict a failure type, a parameter value type, the conditional probability lookup table, and the data format database (block 602). Once the tools are generated, the failure recovery system is deployed to generate failure recovery recommendations for a command line interface-based application (block 604).

Figure 7:
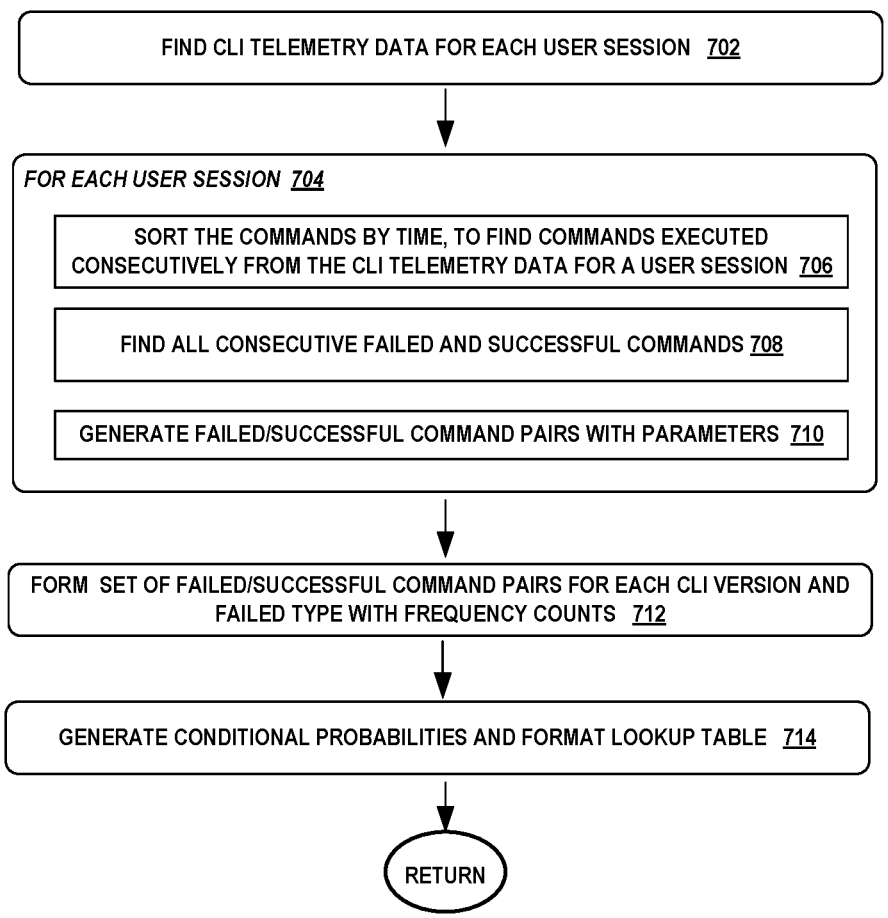
FIG. 7 is a flow diagram illustrating an exemplary method for training the conditional probability model.

Turning to FIG. 7, there is shown an exemplary method 700 for training the conditional probability model. The conditional probability model obtains CLI telemetry data for each user session (block 702). The CLI telemetry data contains raw data representing the execution of CLI commands to the CLI-based application.

For each user session (block 704), the commands are converted into scripts and sorted by time. The scripts include a set of consecutive commands executed within 2 seconds to 15 minutes of each other and by the same user (block 706). Scripts that have consecutive commands issued less than 2 seconds apart are eliminated since they are most likely to be automated scripts. The scripts are filtered to remove help calls and login/logout commands from the sequence of commands in the script.

The scripts from each user session are mined for consecutive sequences of failed commands and immediately succeeding successfully-executed commands (block 708). These commands form a failure-success pair and include parameters, if any, without parameter values (block 710).

The failure-success pairs from each user session are then analyzed to compute the count of the number of unique users that executed a unique failure-success pair (block 712). Failure-success pairs having a frequency of less than a pre-defined threshold are eliminated. The failure-success pairs are then used to generate the conditional probability model and to format the conditional probabilities and related data into a look-up table format (block 714).

Figure 8:
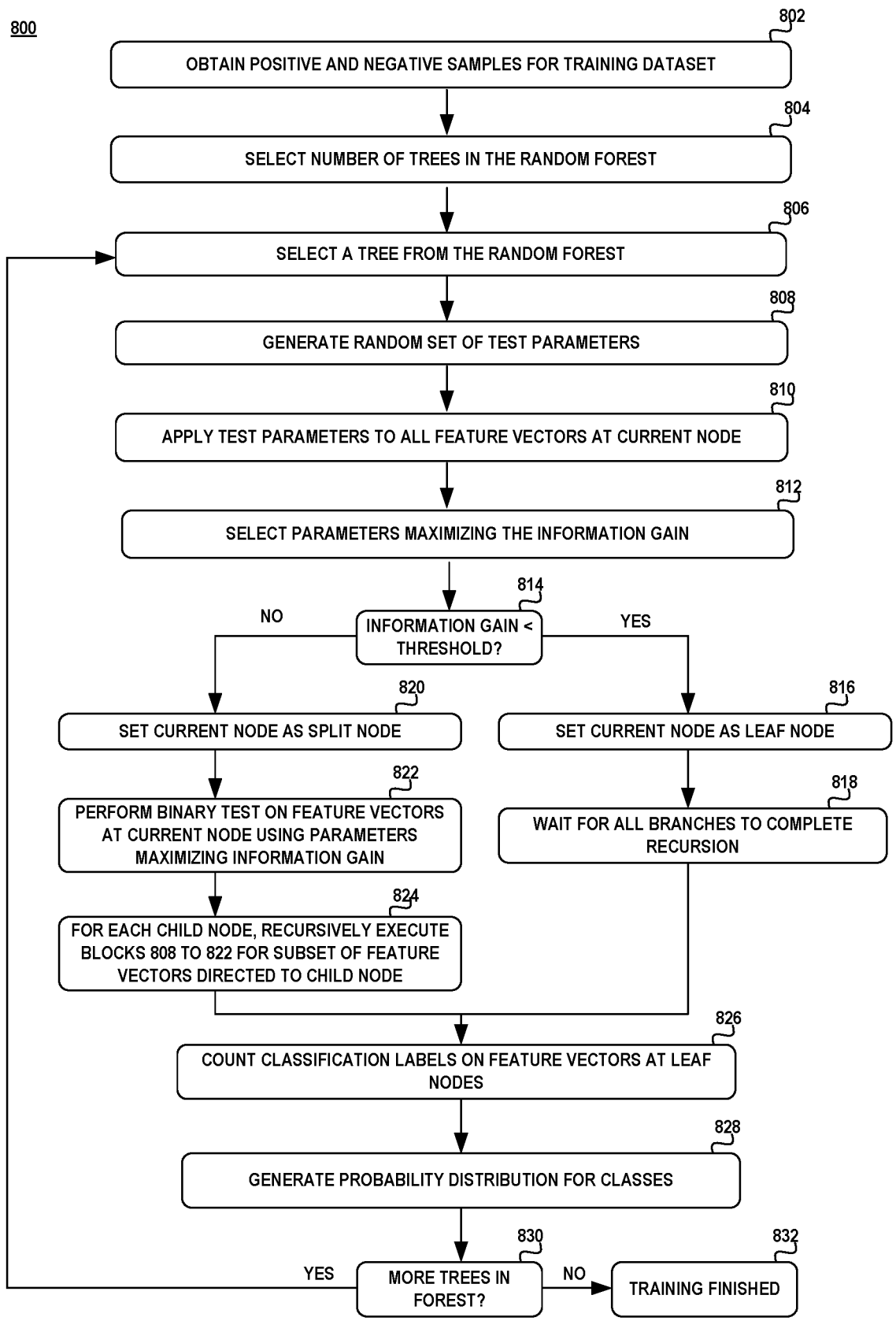
FIG. 8 is a flow diagram illustrating an exemplary method for training a random forest classifier for the failure type classifier and the parameter value type classifier.

FIG. 8 illustrates an exemplary process 800 for training a random forest classifier. This process is used to train the parameter value type classifier and the failure type classifier. Turning to FIG. 8, the training dataset for a classifier is obtained to include both positive and negative samples. For the failure type classifier, the error message containing a description of the failure and an associated label identifying the failure type are used as the training dataset of positive samples for the failure type classifier. Successful completion messages and a corresponding label are used as the training dataset for the negative samples for the failure type classifier. For the parameter value type classifier, the training dataset consists of features from the web examples that produced the parameter value, such as command name, parameter name, the module name of the source, the command description and the parameter description and the corresponding label (Collectively, block 802).

Initially, the number of trees for each random forest is pre-configured to a particular number (block 804). The process starts by selecting a decision tree from the random forest (block 806). A random set of test parameters are then generated for use by the binary tests performed at the root node (block 808).

The binary test is of the form: α>f (x;θ)>β, such that f (x;θ) is a function applied to a feature vector x with parameters θ, and with the output of the function compared to threshold values α and β. If the result of f (x;θ) is in the range between α and β then the result of the binary test is true. Otherwise, the result of the binary test is false. The result of the binary test performed at a split node determines which child node a feature vector is passed to. (Collectively, block 810).

The random set of test parameters generated comprise a set of random values for the function parameter θ and the threshold values α and β. The function parameters of θ of each split node are optimized over a subset θ of all possible parameters. Then, every combination of a test parameter is applied to each feature vector. For each combination, the information gain is calculated. The combination of parameters that maximizes the information is selected and stored at the current node for further use. (Collectively, block 812).

Next, it is determined whether the value for the maximized information gain is less than a threshold (block 814). If the value for the information gain is less than the threshold (block 814—yes), then this indicates that further expansion of the tree does not provide significant benefit and the current depth of the tree is determined. If this is greater than a predefined maximum value, then the current node is set as the leaf node (block 816) and the process waits for all branches to complete recursion (block 818).

If the value for the maximized information gain is greater than or equal to the threshold (block 814—no), and the tree depth is less than the maximum value, then the current node is set as a split node (block 820).

As the current node is a split node, it has child nodes, and the process then moves to training these child nodes. Each child node is trained using a subset of the feature vectors at the current node. The subset of feature vectors sent to a child node is determined using the parameters that maximize the information gain. These parameters are used in the binary test, and the binary test performed on all feature vectors at the current node (block 822). The feature vectors that pass the binary test form a first subset sent to a first child node, and the feature vectors that fail the binary test form a second subset sent to a second child node.

For each of the child nodes, the process shown in blocks 808 to 822 is recursively executed for the subset of feature vectors directed to the respective child node (block 824). In other words, for each child node, new test parameters are generated, applied to the respective subset of feature vectors, parameters maximizing the information gain selected, and the type of node is determined. If it is a leaf node, then the current branch of recursion ceases. If it is a split node, binary tests are performed (block 822) to determine further subsets of feature vectors and another branch of recursion starts. Therefore, this process recursively moves through the tree, training each node until leaf nodes are reached at each branch. As leaf nodes are reached, the process waits until the nodes in all branches have been trained (block 818).

Once all the nodes in the tree have been trained to determine the parameters for the binary test maximizing the information gain at each split node, and leaf nodes have been selected to terminate each branch, the probability distribution can be determined for all the leaf nodes of the tree (block 826). This is achieved by counting the class labels of the feature vectors that reach each of the leaf nodes (block 828). All the features from the feature vectors end up at a leaf node of the tree.

Once the probability distribution has been determined for the leaf nodes of the tree, then if more trees are present (block 830—yes), the process repeats. If all the trees in the forest have been trained (block 830—no), then the training process is complete (block 832). Hence, the training process generates multiple decision trees trained using the training dataset. Each tree comprises multiple split nodes storing optimized test parameters and leaf nodes storing associated probability distributions.

Figure 9:
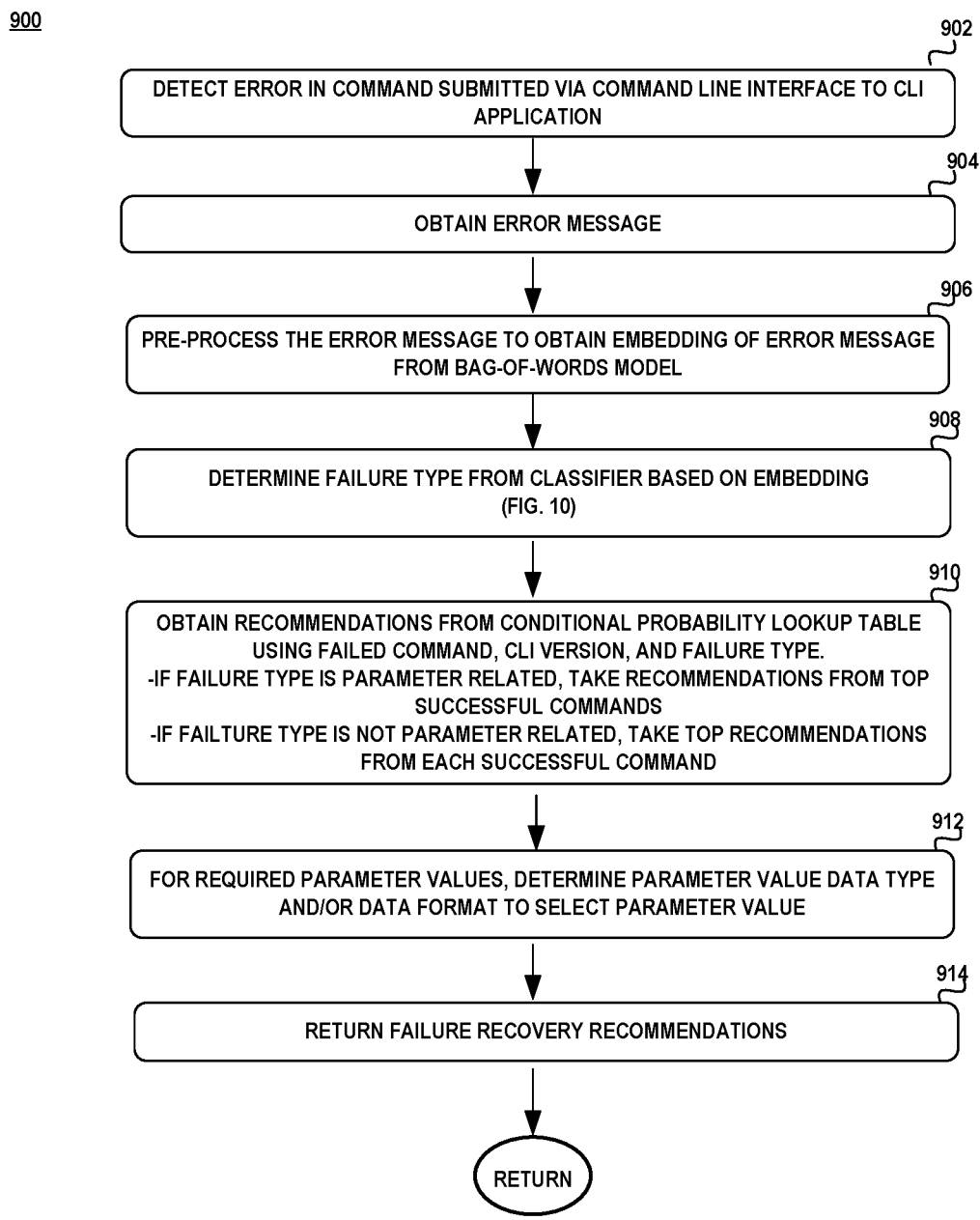
FIG. 9 is a flow diagram illustrating an exemplary method for generating failure recovery recommendations.

FIG. 9 is an exemplary process for predicting a recommendation for a failure 900. A user of the CLI attempts to execute a CLI command which is rejected as an error by the CLI-based application (block 902). The failure recovery system receives the error message which contains the failed command and a description of the failure (block 904). The error message is then pre-processed by the pre-processing component and the filtered error message is input into the bag-of-words model to generate a corresponding embedding (block 906). The embedding is then input into the failure type classifier which identifies an associated failure type (block 908).

The recommendation module uses the CLI version, the failed command and the failure type to search the lookup table for one or more recommendations. In one aspect, the process for selecting an example command from the lookup table distinguishes between a parameter-related failure and a non-parameter-related failure. For example, a parameter-related failure would include the MissingRequiredParameters failure type. A non-parameter-related failure type would include the UnknownSubcommand failure type. (Collectively, block 910)

In the case of a parameter-related failure type, the recommendation module obtains a select number of recommendations from the top success commands associated with the CLI version, failed command and failure type entries in the lookup table. In the case of a non-parameter-related failure type, a select number of recommendations would be formatted from each success command matching the CLI version, failed command and failure type entries. A recommendation would include the command and a set of parameters, if any. (Collectively, block 910).

If a recommendation includes a command with a parameter requiring a parameter value, the recommendation module obtains a parameter value data type from the parameter value type classifier given the success command and parameter name. If multiple parameter values are available, then the recommendation module obtains a data format for the data type of the parameter value. The recommendation module then selects a parameter value from the parameter set of the selected success command having the data type of the parameter value type and data format. (Collectively, block 912).

The recommendation is formatted as a message that includes the error message and the example command in the correct syntax with any subcommands, parameters, and parameter values. The recommendation is then returned back to the user (block 914).

Figure 10:
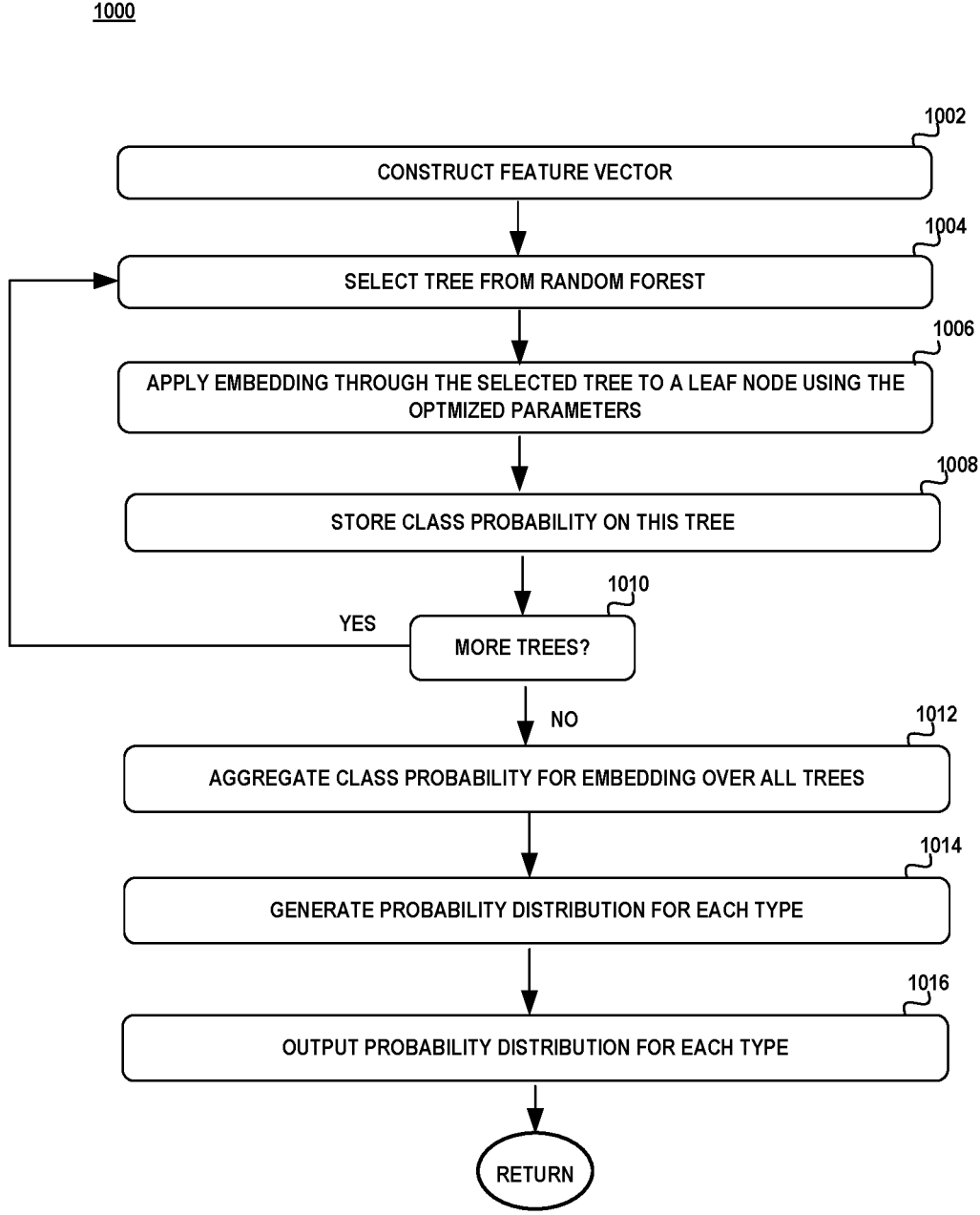
FIG. 10 is a flow diagram illustrating an exemplary method for utilizing a random forest classifier to predict a class from given input.

Attention now turns to the use of the random forest classifiers in inferring the type of the parameter value and the failure type parameter. Turning to FIG. 10, there is shown an exemplary method 1000 for predicting the data type of a parameter value and the failure type. In the case of the failure type, the feature vector includes the embeddings generated from an error message. In the case of a data type for a parameter value, the feature vector includes the embeddings generated from the command name and parameter name of a selected success command (Collectively, block 1002).

The feature vector is applied to each tree in the random forest for classification. A trained decision tree from the random forest is selected (block 1004) and is tested against the trained and optimized parameters in each binary test in each node (block 1006). Based on the result of the test, the feature vector is passed to the appropriate child node (block 1008). The process is repeated until the feature vector reaches a leaf node (block 1010). Once the feature vector reaches a leaf node, the probability distribution associated with this leaf node it stored for this feature vector (block 1012).

If there are more decision trees in the random forest (block 1010—yes), a new decision tree is selected (block 1004). The feature vector is pushed through the tree (block 1006) and the probability distribution stored (block 1008). This is repeated until there are no more decision trees in the random forest (block 1010—no). Once the feature vector has been applied to each tree in the random forest (block 1010—no), then the stored probability distributions that have been stored are aggregated (block 1012) to form the overall probability distribution for each class (block 1014). The overall probability distribution for each class is then output (block 1016).

In the case of the parameter value data type, there may be multiple classes where each class represents a particular data type. In one aspect, there may be two classes where one class represents a string and a second class represents a non-string. In the case of a failure type, there are multiple classes, such as UnknownSubcommand, UnableToParseCommandInput, MissingRequiredParameters, etc. Each class is associated with a particular probability indicating the likelihood that the input features represent the class.

Exemplary Operating Environment

Figure 11:
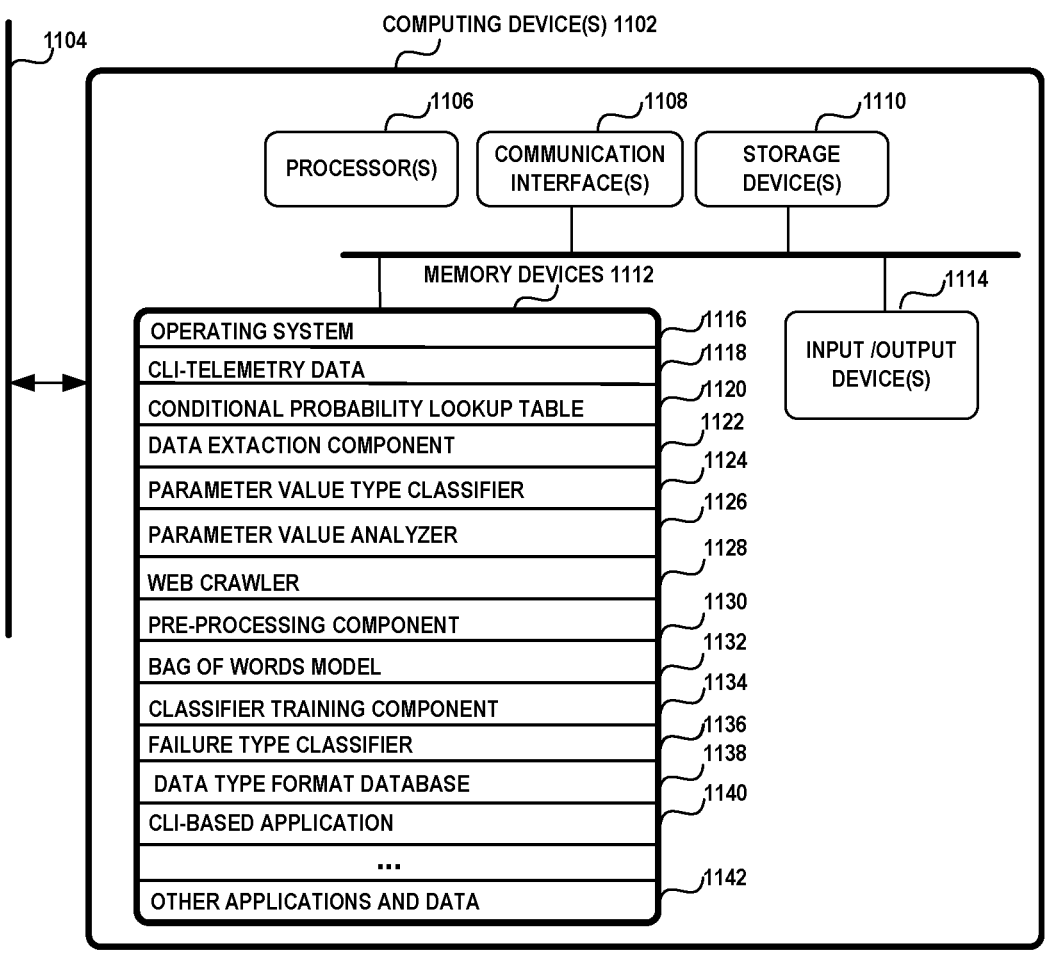
FIG. 11 is a block diagram illustrating an exemplary operating environment.

Attention now turns to a discussion of an exemplary operating environment. FIG. 11 illustrates an exemplary operating environment 1100 used to generate failure recommendations. The operating environment 1100 may be configured as a cloud service having multiple computing devices or configured as a single computing device. The computing devices 1102 are coupled to a network 1104 to other computing devices. However, it should be noted that the aspects disclosed herein is not constrained to any particular configuration of devices and that other configurations are possible.

A computing device 1102 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (IOT) device, a distributed computing system, multiprocessor systems, or combination thereof. The operating environment 1100 may be configured in a network environment, a distributed environment, a multi-processor environment, or a stand-alone computing device having access to remote or local storage devices.

A computing device 1102 may include one or more processors 1106, one or more communication interfaces 1108, one or more storage devices 1110, one or more input/output devices 1114 and one or more memory devices 1112. A processor 1106 may be any commercially available or customized processor and may include dual microprocessors and multi-processor architectures. A communication interface 1108 facilitates wired or wireless communications between the computing devices and other devices.

A storage device 1110 may be computer-readable medium that does not contain propagating signals, such as modulated data signals transmitted through a carrier wave. Examples of a storage device 1110 may include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices in a computing device. The input/output devices 1114 may include a keyboard, mouse, pen, voice input device, touch input device, display, speakers, printers, etc., and any combination thereof.

A memory device 1112 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 1112 may also include one or more external storage devices or remotely located storage devices that do not pertain to propagated signals, such as modulated data signals transmitted through a carrier wave.

Memory devices 1112 may include an operating system 1116, CLI telemetry data 1118, a conditional probability lookup table 1120, a data extraction component 1122, a parameter value type classifier 1124, a parameter value analyzer 1126, a web crawler 1128, a pre-processing component 1130, a bag of words model 1132, a classifier training component 1134, a failure type classifier 1136, a data type format database 1138, a CLI-based application 1140 and other applications and data 1142.

Network 1104 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

A network 1104 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed comprising: one or more processors coupled to a memory; and a program stored in the memory and configured to be executed by the one or more processors, the program including instructions that: detect a plurality of failure-success pairs of command line interface (CLI) commands from historical usage data, a failure-success pair including a successfully-executed CLI command immediately following a failed CLI command; compute a probability for a failure-success pair, the probability representing a likelihood that the successfully-executed CLI command remediates the failed command of the failure-success pair; and select a successfully-executed CLI command, of a failure-success pair, to remediate a failed CLI command based on an associated probability.

In one aspect, the program includes further instructions that: associate a failure type to each of a plurality of failed CLI commands; and select the successfully-executed CLI command to remediate the failed CLI command based on the failure type of the failed CLI command matching the failure type of the successfully-executed CLI command.

In one aspect, the program includes further instructions that: train a failure type classifier to associate a failure type to an error message, the error message including the failed command.

In some aspects, the probability associated with the failure-success pair is based on a frequency of the successfully-executed CLI command immediately following the failed CLI command. In some aspects, a successfully-executed CLI command includes a parameter having a parameter value; and the program includes further instructions that: select a parameter value for the parameter based on a data type of the parameter value.

In one or more aspects, the data type of the parameter value is identified from a parameter value type classifier, the parameter value type classifier trained to identify a data type of a parameter value from publicly-accessible examples. In an aspect, the program includes further instructions that: select the parameter from a parameter set associated with the successfully-executed command based on a highest frequency associated with the selected parameter.

A method is disclosed comprising: obtaining a plurality of failure-success pairs, a failure-success pair including a failed CLI command and a successfully-executed CLI command, wherein the successfully-executed CLI command immediately followed a failed CLI command in historical usage data of the CLI; receiving an error message from a failed CLI script, the failed CLI script including a first failed CLI command; selecting a successfully-executed CLI command to remediate the first failed CLI command based on the first failed CLI command matching the failed CLI command of the selected successfully-executed CLI command; and forming a recommendation to remediate the first failed CLI command, the recommendation including the selected successfully-executed CLI command.

In one or more aspects, the method further comprises: associating a failure type with each failed CLI command of the plurality of failure-success pairs; and selecting the selected successfully-executed CLI command based on a failure type of the first failed CLI command matching a failure type of the selected successfully-executed CLI command. In some aspects, the method further comprises: training a failure type classifier to associate a failure type given an error message having a failed CLI command. In aspect, the failure type classifier is a random forest classifier. In an aspect, the method further comprises: ranking failure-success pairs associated with a common failure type by increasing frequency. The method further comprises: associating a set of parameters with the successfully-executed command of a failure-success pair, the set of parameters derived from historical usage data.

In aspects, the method further comprises: determining a data type of a parameter value for a select parameter of the set of parameters; and using the data type of the parameter value of the select parameter to obtain a selected parameter value. In one or more aspects, the method further comprises: training a classifier to identify the data type of the parameter value from command-parameters pairs of the historical usage data.

A device is disclosed comprising: at least one processor coupled to a memory. The at least one processor is configured to: detect a failure of a command of a command line interface to execute successfully; determine a failure type of the failed command; generate a recommendation to correct the failed command from a conditional probability model given the failed command and the failure type, the recommendation including a success command to remedy the failed command, the conditional probability model predicting the success command based on a probability of the success command immediately following the failed command; and output the recommendation to a user device having initiated the failed command.

In some aspects, the at least one processor is further configured to: receive an error message indicating the failed command; and utilize a failure type classifier to determine the failure type of the failed command. In aspects, the at least one processor is further configured to: generate an embedding of the error message of the failed command using a bag-of-words model, the embedding used by the failure type classifier to predict the failure type. In one or more aspects, the failure type classifier is a random forest classifier. In an aspect, the success command includes a parameter having a parameter value and the at least one processor is further configured to: obtain a data type of the parameter value from a parameter value type classifier; and select the parameter value from a plurality of parameter values of the success command based on the data type of the parameter value.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A system comprising:
one or more processors coupled to a memory; and
a program stored in the memory and configured to be executed by the one or more processors, the program including instructions that:
detect a plurality of failure-success pairs of command line interface (CLI) commands from historical usage data, a failure-success pair including a successfully-executed CLI command immediately following a failed CLI command;

compute a probability for a failure-success pair, the probability representing a likelihood that the successfully-executed CLI command remediates the failed CLI command of the failure-success pair; and select a successfully-executed CLI command, of a failure-success pair, to remediate a failed CLI command based on an associated probability.

2. The system of claim 1, wherein the program includes further instructions that:

associate a failure type to each of a plurality of failed CLI commands; and select the successfully-executed CLI command to remediate the failed CLI command based on the failure type of the failed CLI command matching the failure type of the successfully-executed CLI command.

3. The system of claim 2, wherein the program includes further instructions that:

train a failure type classifier to associate a failure type to an error message, the error message including the failed CLI command.

4. The system of claim 3, wherein the probability associated with the failure-success pair is based on a frequency of the successfully-executed CLI command immediately following the failed CLI command.

5. The system of claim 1, wherein a successfully-executed CLI command includes a parameter having a parameter value; and wherein the program includes further instructions that:

select a parameter value for the parameter based on a data type of the parameter value.

6. The system of claim 5, wherein the data type of the parameter value is identified from a parameter value type classifier, the parameter value type classifier trained to identify a data type of a parameter value from publicly-accessible examples.

7. The system of claim 5, wherein the program includes further instructions that:

select the parameter from a parameter set associated with the successfully-executed command based on a highest frequency associated with the selected parameter.

8. A computer-implemented method, comprising:

obtaining a plurality of failure-success pairs, a failure-success pair including a failed CLI command and a successfully-executed CLI command, wherein the successfully-executed CLI command immediately followed a failed CLI command in historical usage data of the CLI;

receiving an error message from a failed CLI script, the failed CLI script including a first failed CLI command;

selecting a successfully-executed CLI command to remediate the first failed CLI command based on the first failed CLI command matching the failed CLI command of the selected successfully-executed CLI command; and forming a recommendation to remediate the first failed CLI command, the recommendation including the selected successfully-executed CLI command.

9. The computer-implemented method of claim 8, further comprising:

associating a failure type with each failed CLI command of the plurality of failure-success pairs; and selecting the selected successfully-executed CLI command based on a failure type of the first failed CLI command matching a failure type of the selected successfully-executed CLI command.

10. The computer-implemented method of claim 9, further comprising:

training a failure type classifier to associate a failure type given an error message having a failed CLI command.

11. The computer-implemented method of claim 10, wherein the failure type classifier is a random forest classifier.

12. The computer-implemented method of claim 8, further comprising:

ranking failure-success pairs associated with a common failure type by increasing frequency.

13. The computer-implemented method of claim 8, further comprising:

associating a set of parameters with the successfully-executed command of a failure-success pair, the set of parameters derived from historical usage data.

14. The computer-implemented method of claim 13, further comprising:

determining a data type of a parameter value for a select parameter of the set of parameters; and using the data type of the parameter value of the select parameter to obtain a selected parameter value.

15. The computer-implemented method of claim 13, further comprising:

training a classifier to identify the data type of the parameter value from command-parameters pairs of the historical usage data.

16. A device, comprising:

at least one processor coupled to a memory;

wherein the at least one processor is configured to:

detect a failure of a command of a command line interface to execute successfully;

determine a failure type of the failed command;

generate a recommendation to correct the failed command from a conditional probability model given the failed command and the failure type, the recommendation including a success command to remedy the failed command, the conditional probability model predicting the success command based on a probability of the success command immediately following the failed command; and output the recommendation to a user device having initiated the failed command.

17. The device of claim 16, wherein the at least one processor is further configured to:

receive an error message indicating the failed command; and utilize a failure type classifier to determine the failure type of the failed command.

18. The device of claim 17, wherein the at least one processor is further configured to:

generate an embedding of the error message of the failed command using a bag-of-words model, the embedding used by the failure type classifier to predict the failure type.

19. The device of claim 17, wherein the failure type classifier is a random forest classifier.

20. The device of claim 16, wherein the success command includes a parameter having a parameter value, wherein the at least one processor is further configured to:

obtain a data type of the parameter value from a parameter value type classifier; and select the parameter value from a plurality of parameter values of the success command based on the data type of the parameter value.

* * * * *